(12) United States Patent
Tsuchiya et al.

(10) Patent No.: US 12,137,307 B2
(45) Date of Patent: Nov. 5, 2024

(54) INFORMATION PROCESSING DEVICE, METHOD, AND COMPUTER-READABLE STORAGE MEDIUM

(71) Applicant: KONICA MINOLTA PLANETARIUM CO., LTD., Tokyo (JP)

(72) Inventors: Makoto Tsuchiya, Toyokawa (JP); Nobuhiro Ishimaki, Shizuoka (JP); Rie Sakurai, Toyokawa (JP); Kenichi Komaba, Tokyo (JP)

(73) Assignee: KONICA MINOLTA PLANETARIUM CO., LTD., Tokyo (JP)

( * ) Notice: Subject to any disclaimer, the term of this patent is extended or adjusted under 35 U.S.C. 154(b) by 353 days.

(21) Appl. No.: 17/573,912

(22) Filed: Jan. 12, 2022

(65) Prior Publication Data

US 2022/0224870 A1    Jul. 14, 2022

(30) Foreign Application Priority Data

Jan. 13, 2021    (JP) .................................. 2021-003304

(51) Int. Cl.
*H04N 9/31*    (2006.01)
(52) U.S. Cl.
CPC ......... *H04N 9/3191* (2013.01); *H04N 9/3141* (2013.01)
(58) Field of Classification Search
CPC . G06F 16/23; G06F 8/65; G06F 8/658; G06F 11/1402; G06F 11/3442; G06F 16/21; G06F 16/24573; G06F 16/24575; G06F 16/24578; G06F 16/29; G06F 16/9024; G06F 16/93; G06F 3/0414; G06F 3/0604; G06F 3/0655; G06F 3/0673; G06F 1/1686; G06F 12/0246; G06F 13/16; G06F 13/36; G06F 13/362; G06F 13/42;
(Continued)

(56) References Cited

U.S. PATENT DOCUMENTS 9,082,401 B1 *  7/2015  Fructuoso ............... G10L 13/08
9,100,629 B1 *  8/2015  Brenden .................. G06F 3/14
(Continued)

FOREIGN PATENT DOCUMENTS

JP    2008-096525 A    4/2008
WO    2018/180143 A1   10/2018

OTHER PUBLICATIONS

Notice of Reasons for Refusal issued in corresponding Japanese Application No. 2021-003304 mailed Sep. 10, 2024 (6 pages).

*Primary Examiner* — Negussie Worku
(74) *Attorney, Agent, or Firm* — Osha Bergman Watanabe & Burton LLP

(57) ABSTRACT

An information processing device includes: a communication interface that receives instructions including a command to control an instrument; a storage that stores a rule of an execution procedure of the command; a CPU that verifies the instructions; and an output interface that outputs a verification result of the instructions. The CPU acquires the instructions through the communication interface, reads the rule from the storage, and detects a defect of the instructions by comparing an execution procedure of the command included in the instructions with the rule. The output interface outputs a detection result of the defect.

18 Claims, 14 Drawing Sheets

(58) Field of Classification Search
CPC .. G06F 13/4282; G06F 15/76; G06F 15/7867; G06F 16/24522; G06F 16/2455; G06F 16/90332; G06F 16/9535; G06F 16/955; G06F 17/18; G06F 18/2415; G06F 2009/45587; G06F 21/35; G06F 21/602; G06F 21/6209; G06F 21/78; G06F 2209/509; G06F 2209/548; G06F 2209/549; G06F 2212/1016; G06F 2212/1056; G06F 2212/7201; G06F 2212/7204; G06F 2213/0026; G06F 2221/2107; G06F 3/011; G06F 3/04144; G06F 3/04166; G06F 3/0447; G06F 3/045; G06F 3/047; G06F 3/0605; G06F 3/0607; G06F 3/0608; G06F 3/061; G06F 3/0619; G06F 3/0623; G06F 3/0631; G06F 3/064; G06F 3/0643; G06F 3/0652; G06F 3/0658; G06F 3/0659; G06F 3/0677; G06F 3/0679; G06F 3/0688; G06F 30/13; G06F 40/194; G06F 40/279; G06F 40/284; G06F 40/295; G06F 40/30; G06F 9/3004; G06F 9/30054; G06F 9/30087; G06F 9/3842; G06F 9/445; G06F 9/44505; G06F 9/45558; G06F 9/4881; G06F 9/5044; G06F 9/5077; G06F 9/542; G06F 9/546; H04N 5/85; H04N 9/8042; H04N 19/105; H04N 19/132; H04N 19/136; H04N 19/176; H04N 19/593; H04N 19/70; H04N 9/3141; H04N 9/3191; H04N 9/8063; H04N 9/8205; H04N 1/00127; H04N 1/00925; H04N 1/2166; H04N 1/32112; H04N 1/3873; H04N 1/4486; H04N 19/124; H04N 19/13; H04N 19/174; H04N 19/1887; H04N 19/44; H04N 19/91; H04N 19/93; H04N 21/42204; H04N 21/47; H04N 2201/218; H04N 2201/3225; H04N 2201/3247; H04N 2201/3277; H04N 25/585; H04N 25/60; H04N 25/75; H04N 25/76; H04N 5/92; H04N 7/17318; H04N 7/183; H04N 7/188; H04N 9/8066; H04N 9/8227; H04N 9/877

USPC ........................................................ 358/1.15

See application file for complete search history.

(56) References Cited

U.S. PATENT DOCUMENTS

| | | | |
|---|---|---|---|
| 2006/0158722 A1* | 7/2006 | Fujimoto | G02B 23/00 359/399 |
| 2017/0124297 A1* | 5/2017 | Baldwin | G06Q 50/184 |
| 2017/0329208 A1* | 11/2017 | Takahashi | G06F 3/1423 |
| 2018/0014008 A1* | 1/2018 | Sugiura | G03B 21/142 |
| 2018/0280794 A1* | 10/2018 | Brenden | A63F 13/795 |
| 2019/0099666 A1* | 4/2019 | Chu | A63F 13/424 |
| 2022/0164414 A1* | 5/2022 | Baldwin | G06F 21/10 |

* cited by examiner

FIG.3

```
//AFTER CAUTION IS DESCRIBED, CLOSE SHUTTER OF PROJECTOR
0 TurnON Projector_Shutter <DIG>

//CALL VIDEO
//IG1
+0.2    Run    Cmd    <DIG>    PlayMovie    openFile    1    0
"C:/DIG/pgm/2020/0/CM_2020_0.mp4" 60
+0.1 Run Cmd <DIG> PlayMovie position 1 0 dome(0,45) 0
+0.1 Run Cmd <DIG> PlayMovie magnification 1 0 0.9 0

//IG2
+0.2    Run    Cmd    <DIG>    PlayMovie    openFile    1    1
"C:/DIG/pgm/2020/1/CM_2020_1.mp4" 60
+0.1 Run Cmd <DIG> PlayMovie setPosition 1 1 Dome(180,45) 0
+0.1 Run Cmd <DIG> PlayMovie magnification 1 1 0.90

//Console
+0.2    Run    Cmd    <DIG>    PlayMovie    openFile    1    2
"C:/DIG/pgm/2020/2/CM_2020_2.mp4" 60
+0.1 Run Cmd <DIG> Simulation visible false 0
+0 Run Cmd <DIG> PlayMovie visible 1 true //START MAIN STORY
00:00:57.0 Run Cmd <DIG> Simulation visible false 3
+1 Fade RoomLamp <OPT> 0% 2sec
0 Run Cmd <DIG> Projector dimmer 1 100 2
0 Run Cmd <DIG> Projector dimmer 2 100 2

00:00:58.7 Run Cmd <DIG> PlayMovie visible 1 true
00:00:59.2 Run Cmd <DIG> PlayMovie play 1
00:02:02.00 Run Cmd <DIG> PlayMovie stop 1
00:02:03.0 Run Cmd <DIG> PlayMovie closeFile 1

//+1 Adjust Reset <DIG> Channel=All

+0.2 Remove Me <SYS>
```

INFORMATION PROCESSING DEVICE, METHOD, AND COMPUTER-READABLE STORAGE MEDIUM

CROSS-REFERENCE TO RELATED APPLICATIONS

The entire disclosure of Japanese Patent Application No. 2021-003304, filed on Jan. 13, 2021, is incorporated herein by reference.

BACKGROUND

Technical Field

The present disclosure relates to control of an instrument used in a theater or attraction, and more particularly, to processing for verifying instructions that control the instrument.

Description of Related Art

A theater, an attraction, and the like provide service to spectators by linking various instruments. For example, a planetarium projects movement of a constellation or a star on a dome-shaped curved screen by a projector. In addition, a bodily sensation type theater system introduced in a movie theater or the like produces realistic feeling by linking effects such as seat motion, water splash, wind, scent, and flash with movie scenes. A program including a command for the instrument may be used in order to control each instrument used in these theaters, attractions, and the like.

Regarding the program controlling the instrument, for example, Japanese Laid-Open Patent Publication No. 2008-96525 discloses "a digital planetarium projection device includes: an operation unit that receives an operation by an operator related to projection; an operation display panel that displays information about the projection to the operator; a manual process recording unit that records an operation procedure performed on the operation unit; a controller that executes the projection according to the operation procedure recorded in the manual process recording unit or executes the projection in accordance with a program code in which the operation procedure is recorded in a predetermined programming language; and a program recording unit that records the operation procedure in the program code in the programming language based on the operation procedure performed on the operation unit, in which the program recording unit records a comment indicating a display content of the operation display panel in the program code together with the operation procedure" (see [Abstract]).

According to the technique disclosed in Japanese Laid-Open Patent Publication No. 2008-96525, it is difficult to verify whether a program controlling the instrument includes the defect. Accordingly, there is a need for a technique facilitating verification whether the defect is included in a program controlling the instrument.

SUMMARY

An information processing device reflecting one aspect of the present invention comprises: a communication unit (i.e., a communication interface) that receives instructions including at least one command to control at least one instrument; a storage that stores a rule of an execution procedure of the command; a verification unit (i.e., a CPU) that verifies the instructions; and an output unit (i.e., an output interface) that outputs a verification result of the instructions. The verification unit acquires the instructions through the communication unit, reads the rule from the storage, and detects a defect of the instructions by comparing an execution procedure of the command included in the instructions with the rule. The output unit outputs an execution result (i.e., a detection result) of processing for detecting the defect of the instructions.

According to another aspect, a method for controlling an instrument is provided. The method includes: acquiring instructions including a command to control at least one instrument; acquiring a rule of an execution procedure of the command; detecting a defect of the instructions by comparing the execution procedure of the command included in the instructions with the rule; and outputting an execution result (i.e., a detection result) of processing for detecting the defect of the instructions.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a view illustrating an example of instructions 300 according to one or more embodiments.

DETAILED DESCRIPTION OF EMBODIMENTS

Figure 1:
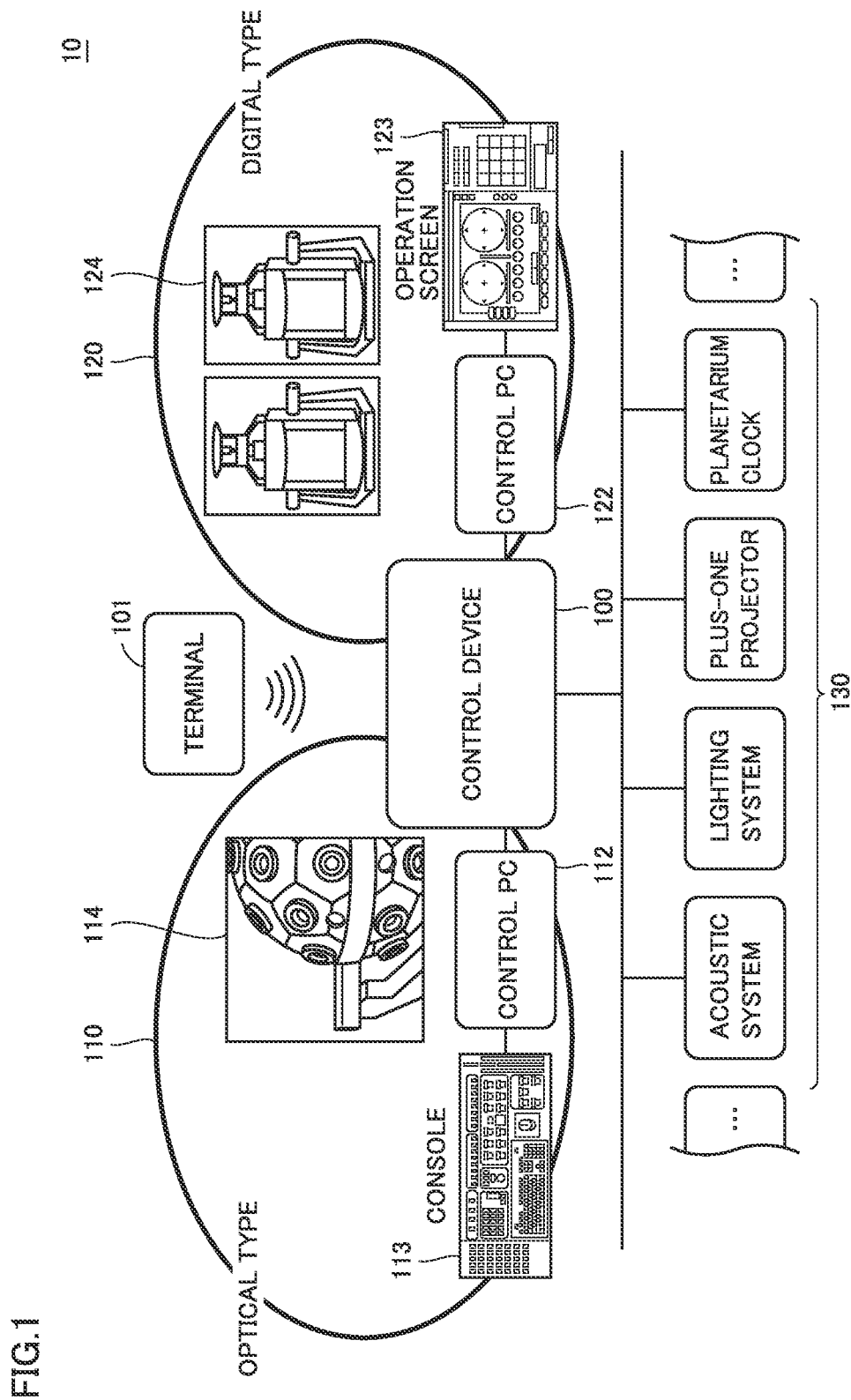
FIG. 1 is a view illustrating an example of a configuration of a theater system 10 according to one or more embodiments.

Hereinafter, embodiments of the present invention will be described with reference to the drawings. However, the scope of the invention is not limited to the disclosed embodiments. In the following description, the same component is denoted by the same reference numeral. Those names and functions are the same. Accordingly, the detailed description thereof will not be repeated.

FIG. 1 is a view illustrating an example of a configuration of a theater system 10 according to one or more embodiments. Hereinafter, a verification procedure of instructions that control an instrument of one or more embodiments will be described using a planetarium as an example, but an application target of the verification procedure of the instructions that control the instrument of one or more embodiments is not limited to the planetarium. In one aspect, the verification procedure of the instructions that control the instrument of one or more embodiments is also applicable to instructions that control an instrument used in a tangible theater such as a movie theater and a musical, or instructions that control an instrument used in an attraction. At this point, the "instructions" indicates not instructions installed in an individual instrument, but a control procedure of an entire system. The control procedure of the entire system includes at least one command transmitted from the control device of the system to each instrument. In other words, the instructions of one or more embodiments can also be said to be a playbook, a scenario, or a script of a content provided to spectators in conjunction with the instrument included in a certain system.

Theater system 10 includes a control device 100, a terminal 101, an optical type planetarium device 110, a digital type planetarium device 120, and an external instrument 130. Optical type planetarium device 110 includes an optical type planetarium projector 114, a control personal computer (PC) 112 of optical type planetarium projector 114, and a console 113. In one aspect, some or all of optical type planetarium projector 114, control PC 112, and console 113 may be integral or separate instruments. Digital type planetarium device 120 includes a digital type planetarium projector 124 and a control PC 122 of digital type planetarium projector 124. An operation screen 123 can be displayed on a display of control PC 122. In one aspect, digital type planetarium projector 124 and control PC 122 may be integrated or separate instruments. Optical type planetarium projector 114 and digital type planetarium projector 124 may be collectively referred to as a "projector". Theater system 10 may selectively include optical type planetarium device 110 and digital type planetarium device 120, or may include both.

Terminal 101 acquires voice information of a commentator through a microphone and an amplifier (not illustrated). In addition, terminal 101 executes conversion of the acquired voice information into text and search for a command, and transmits the command to control device 100. In this case, the command is a command for the projector. Control device 100 can cause the projector to execute an operation associated with the command. Alternatively, terminal 101 may receive an input operation of the commentator and transmit a command according to predetermined instructions to control device 100. In one aspect, terminal 101 may be a tablet, a smartphone, a laptop computer, a desktop computer, or any other device.

Control device 100 transmits a command acquired from terminal 101 to each instrument (projector and external instrument 130) or a control PC of each instrument to cause each instrument to execute the operation associated with the command. Control device 100 can communicate with a plurality of terminals 101 and cause each instrument to execute the command obtained from each terminal 101. Furthermore, control device 100 can receive instructions including a plurality of commands from terminal 101 or another device and control each instrument according to the instructions. In one aspect, control device 100 may be a laptop computer, a desktop computer, or any other device.

Control PC 112 controls optical type planetarium projector 114. Control PC 112 receives a command for optical type planetarium projector 114 from control device 100. Then, control PC 112 transmits a control signal to optical type planetarium projector 114, and causes optical type planetarium projector 114 to execute an operation associated with the command.

In addition to control device 100, control PC 112 receives the operation input from console 113. Then, control PC 112 transmits the control signal to optical type planetarium projector 114, and causes optical type planetarium projector 114 to execute the operation based on the operation input from console 113.

In one aspect, control device 100 may have the function of control PC 112. In another aspect, optical type planetarium projector 114 may have the function of control PC 112. Optical type planetarium projector 114 includes numbers of motors and light emitting diodes (LEDs). Optical type planetarium projector 114 displays a constellation or the like on a dome-shaped curved screen by turning on the LEDs. In one aspect, optical type planetarium projector 114 may use an arbitrary light source such as a light source using a filament instead of the LED.

Control PC 122 controls the digital type planetarium projector 124. Control PC 122 receives a command for digital type planetarium projector 124 from control device 100. Then, control PC 122 transmits the control signal to digital type planetarium projector 124, and causes digital type planetarium projector 124 to execute the operation associated with the command.

In addition to control device 100, control PC 122 receives the operation input from operation screen 123. Then, control PC 122 transmits the control signal to digital type planetarium projector 124, and causes digital type planetarium projector 124 to execute the operation based on the operation input from operation screen 123.

In one aspect, control device 100 may include the function of control PC 122. In another aspect, digital type planetarium projector 124 may include the function of control PC 122. Digital type planetarium projector 124 uses a projector instead of the LED to display the constellation or the like on the dome-shaped curved screen.

External instrument 130 is used by being connected to any one of control device 100, control PC 112, and control PC 122. In one aspect, external instrument 130 may be an acoustic system, a lighting system, an auxiliary projector, a planetarium clock, a lifter, a guide light, an aroma generator, an audio player, or the like. For example, the auxiliary projector can be used for notification of prohibited items (for example, eating and drinking or conversation during projection) in the dome.

Figure 2:
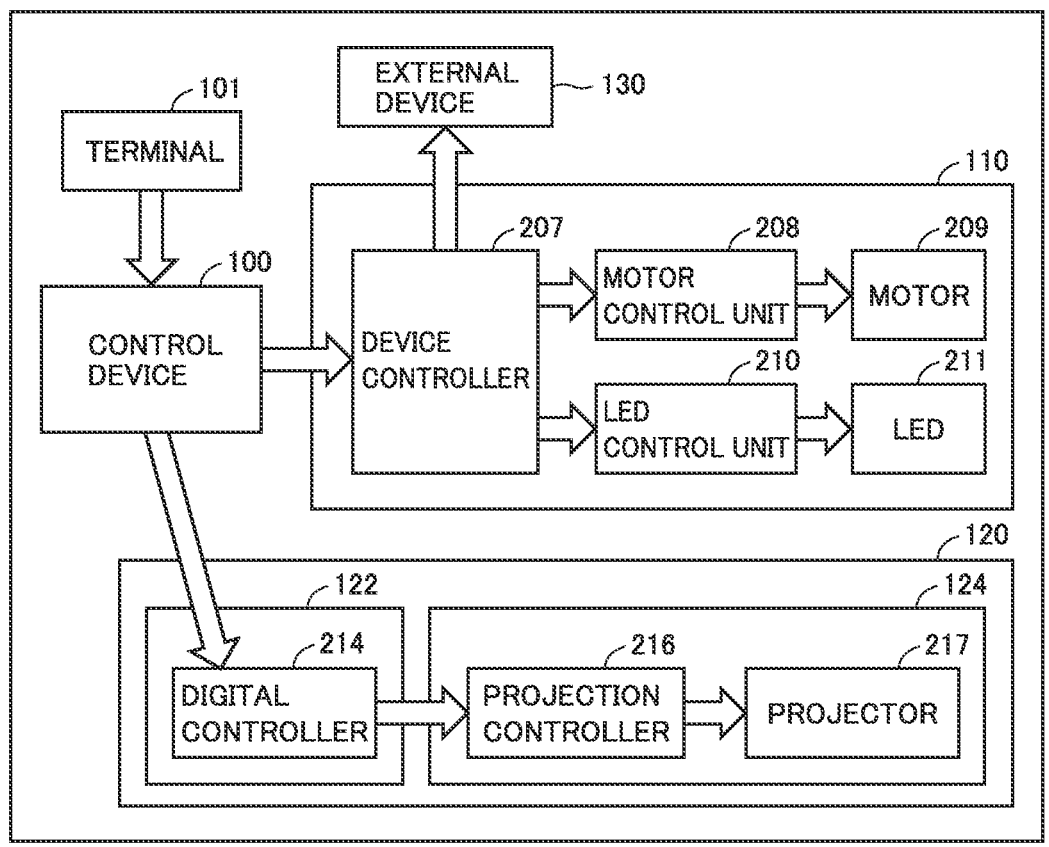
FIG. 2 is a view illustrating an example of a hardware configuration of each projector.

FIG. 2 is a view illustrating an example of a hardware configuration of each projector. With reference to FIG. 2 the hardware configuration of the projector of one or more embodiments will be described. Optical type planetarium device 110 includes an instrument controller 207, a motor control unit 208, a motor 209, an LED control unit 210, and an LED 211. In one aspect, all of these configurations may be implemented as an integrated device or individual devices. For example, when each configuration is implemented as an individual device, instrument controller 207 corresponds to control PC 112, and motor control unit 208, motor 309, LED control unit 210, and LED 211 correspond to optical type planetarium projector 114.

Optical type planetarium device 110 projects a star, a planet, a moon, a constellation picture, and the like on the dome-shaped curved screen by the LED. Instrument controller 207 controls various instruments such as external instrument 130 connected to optical type planetarium projector 114. Instrument controller 207 also controls motor control unit 208 and LED control unit 210 that are provided in optical type planetarium projector 114. Instrument controller 207 receives the command from control device 100, and causes various instruments connected to optical type planetarium projector 114, motor control unit 208, and LED control unit 210 to execute operations associated with the command based on the command. Motor control unit 208 drives motor 209 that operates optical type planetarium projector 114. LED control unit 210 lights LED 211 that projects a video.

Digital type planetarium device 120 includes control PC 122 and digital type planetarium projector 124. Control PC 122 includes a digital type controller 214. Digital type planetarium projector 124 includes a projection controller 216 and a projection unit 217.

Unlike optical type planetarium projector 114, digital type planetarium projector 124 uses the projector instead of the LED and the lens. Based on the command received from control device 100, digital type controller 214 transmits the control signal to digital type planetarium projector 124 to operate digital type planetarium projector 124. Projection controller 216 controls projection unit 217 based on the control signal. Projection unit 217 projects a star, a planet, a moon, a constellation picture, and the like onto the screen.

FIG. 3 is a view illustrating an example of instructions 300 of one or more embodiments. For example, instructions 300 in FIG. 3 includes at least one command to cause each instrument to execute the operation such as open and close of a shutter of a projector and playing (including display, movement, and the like of a heavenly body) of a movie. Control device 100 sequentially transmits each command included in instructions 300 to control PC 112 and control PC 122 to control each instrument. Furthermore, when external instrument 130 is connected to control device 100, control device 100 can transmit the command or the control signal associated with the command to each external instrument 130 and cause each external instrument 130 to execute the operation associated with the command.

Such instructions can be used not only when actually controlling each instrument of the theater or attraction, but also to check whether each instrument of the theater or attraction works without problems during a preliminary preparation period (sometimes referred to as a loading period).

However, when control device 100 actually controls each instrument based on the instructions, it takes a huge amount of time to verify a defect and correct the instructions. Accordingly, control device 100 may verify the defect of the instructions without actually controlling each instrument. For this reason, control device 100 of one or more embodiments has a function of verifying the defect of the instructions by simulation without actually controlling each instrument. The function will be described in detail below.

Figure 4:
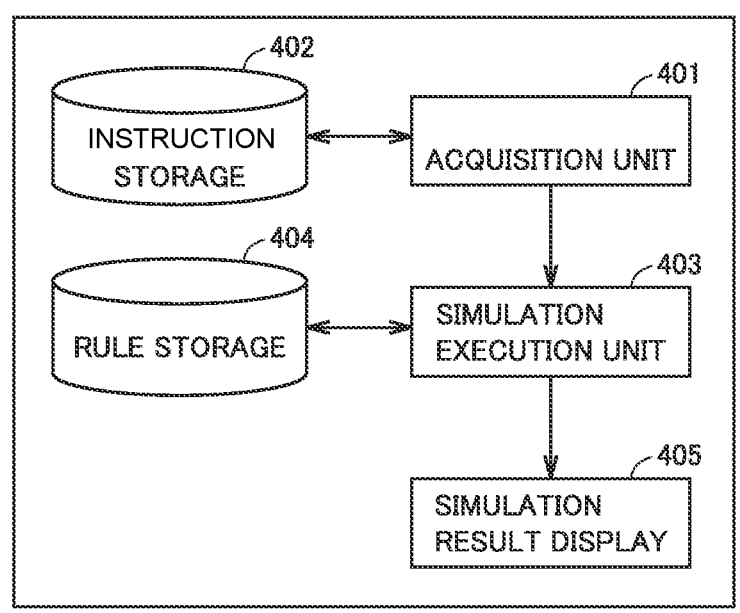
FIG. 4 is a view illustrating an example of a functional block of a control device 100.

FIG. 4 is a view illustrating an example of a functional block of a control device 100. In one aspect, each configuration in FIG. 4 can be executed by hardware in FIG. 5 executing software implementing each function. In addition, each configuration in FIG. 4 is a configuration related to processing for verifying the instructions, and control device 100 may further include a configuration other than the configuration in FIG. 4. Control device 100 includes an acquisition unit 401, an instruction storage 402, a simulation execution unit 403, a rule storage 404, and a simulation result display 405.

Acquisition unit 401 acquires the instructions including at least one command from terminal 101 or another device, and stores the instructions in the instruction storage 402. In one aspect, acquisition unit 401 may output a simulation execution request to simulation execution unit 403 based on acquisition of a new instruction(s).

Simulation execution unit 403 acquires a simulation target instruction(s) from acquisition unit 401. In addition, simulation execution unit 403 acquires a rule defined in the instructions from rule storage 404. For example, the rule includes a rule related to a description that should not exist in the instructions, such as execution order of the command and a combination of prohibited commands, or a description that is not recommended. Simulation execution unit 403 simulates the instructions based on the rule, and verifies whether the instructions normally operate. Simulation execution unit 403 outputs a simulation execution result to simulation result display 405.

Simulation result display 405 displays the simulation execution result. In one aspect, simulation result display 405 may display the simulation execution result on the display connected to control device 100. In another aspect, simulation result display 405 may transmit the simulation execution result to another device. The simulation execution result can include information about a defect part of the instructions and warning information.

Figure 5:
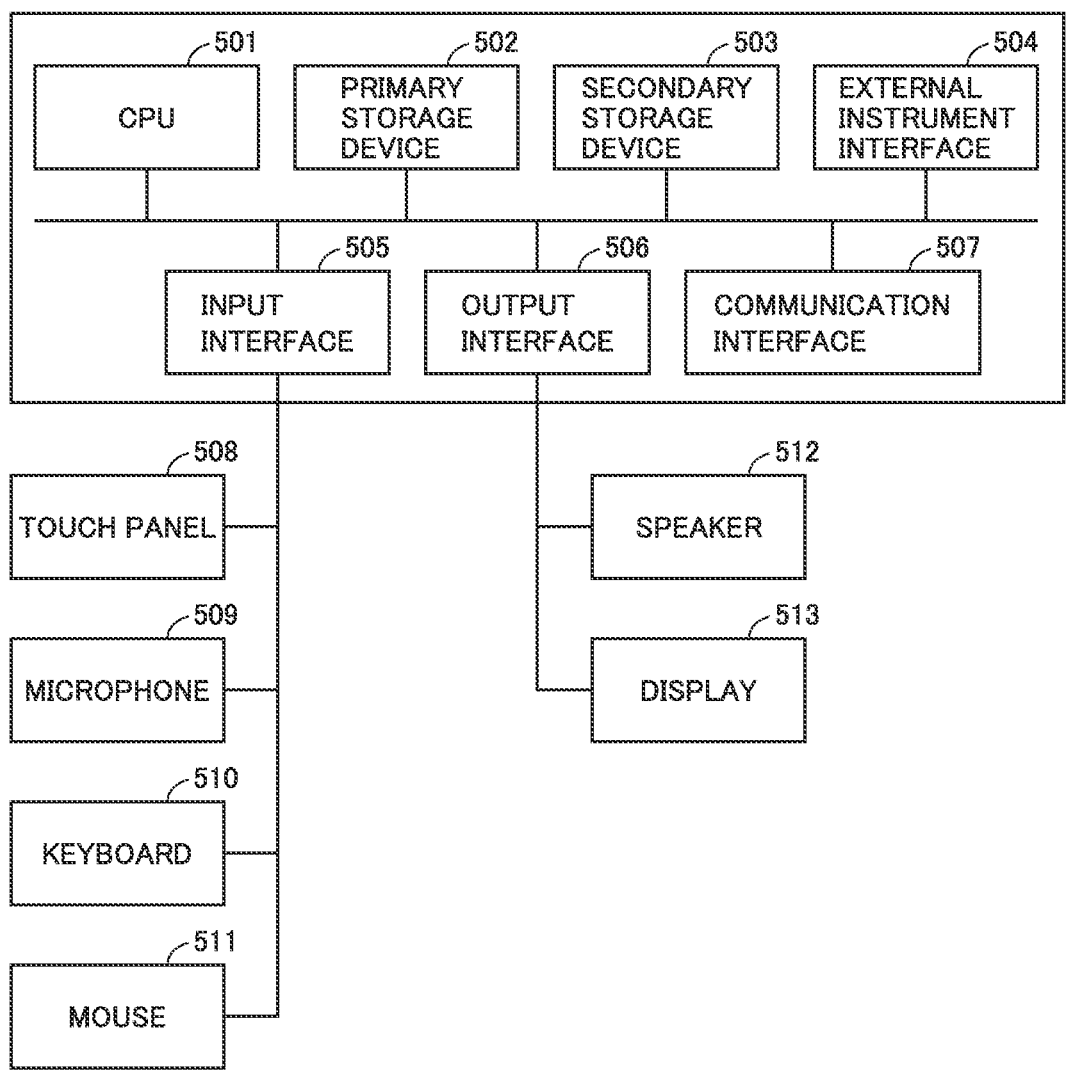
FIG. 5 is a view illustrating an example of a hardware configuration of a device 500 that can be used as a terminal 101 and the control device 100.

FIG. 5 is a view illustrating an example of a hardware configuration of a device 500 that can be used as a terminal 101 and the control device 100. In one aspect, device 500 may be a PC, a smartphone, a tablet, or any other information processing device. For example, control device 100 can be implemented by device 500 that is a PC, and terminal 101 can be implemented by device 500 that is a tablet.

Device 500 includes a central processing unit (CPU) 501, a primary storage device 502, a secondary storage device 503, an external instrument interface 504, an input interface 505, an output interface 506, and a communication interface 507.

CPU 501 processes the instructions and data stored in primary storage device 502. Primary storage device 502 stores the instructions executed by CPU 501 and data referred to. In one aspect, a dynamic random access memory (DRAM) may be used as primary storage device 502.

Secondary storage device 503 stores instructions, data, and the like for a long period of time. Because secondary storage device 503 is generally slower than primary storage device 502, the data directly used by CPU 501 is disposed in primary storage device 502, and other data is disposed in secondary storage device 503. In one aspect, a non-volatile storage device such as a hard disk drive (HDD) and a solid state drive (SSD) may be used as secondary storage device 503.

For example, external instrument interface 504 is used when an auxiliary device is connected to control device 100. In general, a universal serial bus (USB) interface is often used as external instrument interface 504.

Input interface 505 is used to connect a keyboard, a mouse, and the like. A USB interface may be used as input interface 505. In one aspect, input interface 505 may be connected to a touch panel 508, a microphone 509, a keyboard 510, a mouse 511, or any other input instrument.

Output interface 506 is used to connect an output device such as a display. In one aspect, a high-definition multimedia interface (HDMI) (registered trademark) or a digital visual interface (DVI) may be used as output interface 506. In one aspect, output interface 506 may be connected to a speaker 512, a display 513, or any other output instrument.

Communication interface 507 is used to communicate with an external communication instrument. In one aspect, a local area network (LAN) port, a wireless fidelity (Wi-Fi (registered trademark)) transmission and reception device, or the like may be used as output interface 506.

With reference to FIGS. 6 to 9, the procedure of the instruction defect detection processing in control device 100 will be described below. In one aspect, CPU 501 may read the instructions performing the processing in FIGS. 6 to 9 from secondary storage device 503 to primary storage device 502 and execute the instructions. In another aspect, a part or all of the processing can be implemented as a combination of circuit elements configured to execute the processing.

Figure 6:
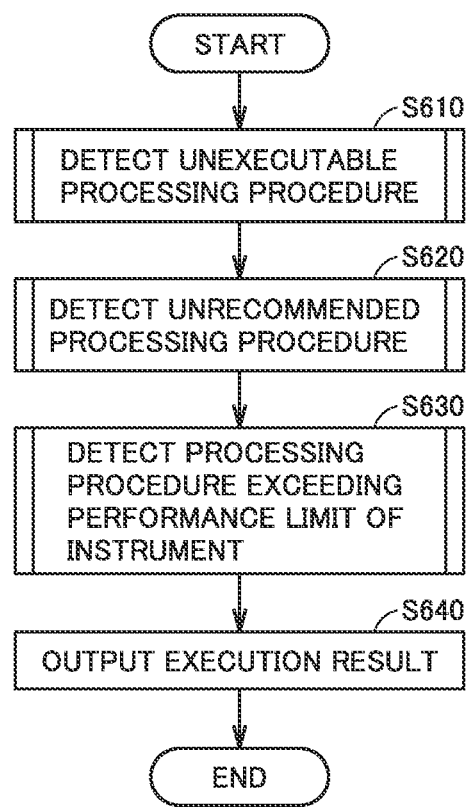
FIG. 6 is a view illustrating an example of a procedure of processing for detecting a defect of instructions in the control device 100.

FIG. 6 is a view illustrating an example of a procedure of processing for detecting a defect of instructions in the control device 100. CPU 501 can repeatedly execute the processing in FIG. 6 for each command included in the instructions. In the processing of FIGS. 6 to 9, CPU 501 does not need to actually operate the instrument included in theater system 10, and can simulate the execution of the instructions to detect the defect of the instructions. In one aspect, CPU 501 may include a mode detecting the defect by actually operating the instrument. In another aspect, when performing each determination processing in the processing of FIGS. 6 to 9, CPU 501 can appropriately read necessary information from rule storage 404 and use the information.

Figure 7:
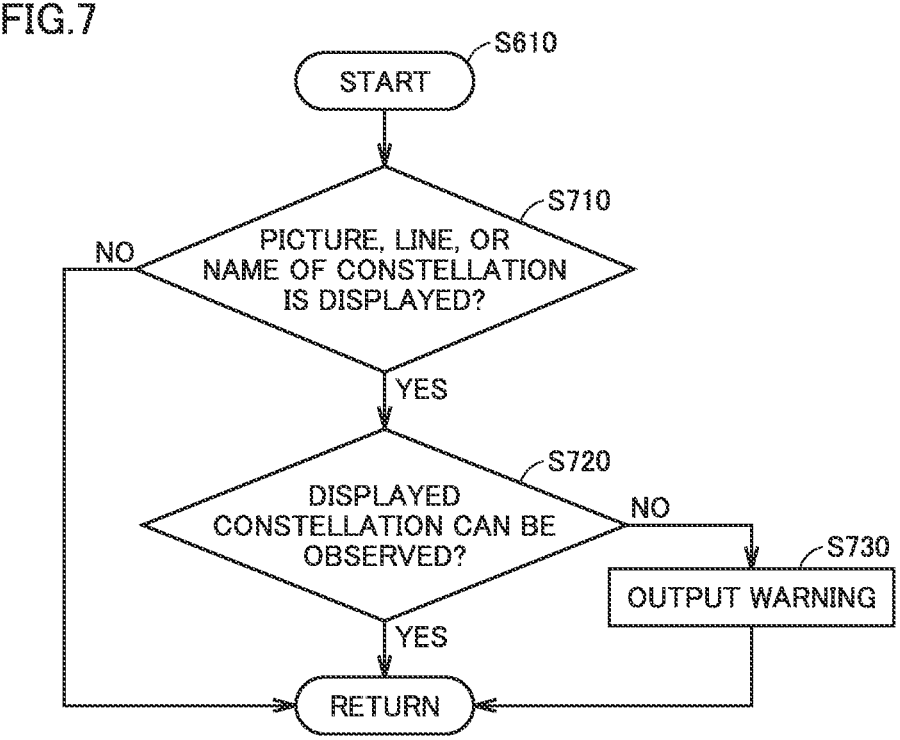
FIG. 7 is a view illustrating an example of a first procedure for detecting whether an unexecutable processing procedure is included in the instructions.
Figure 8:
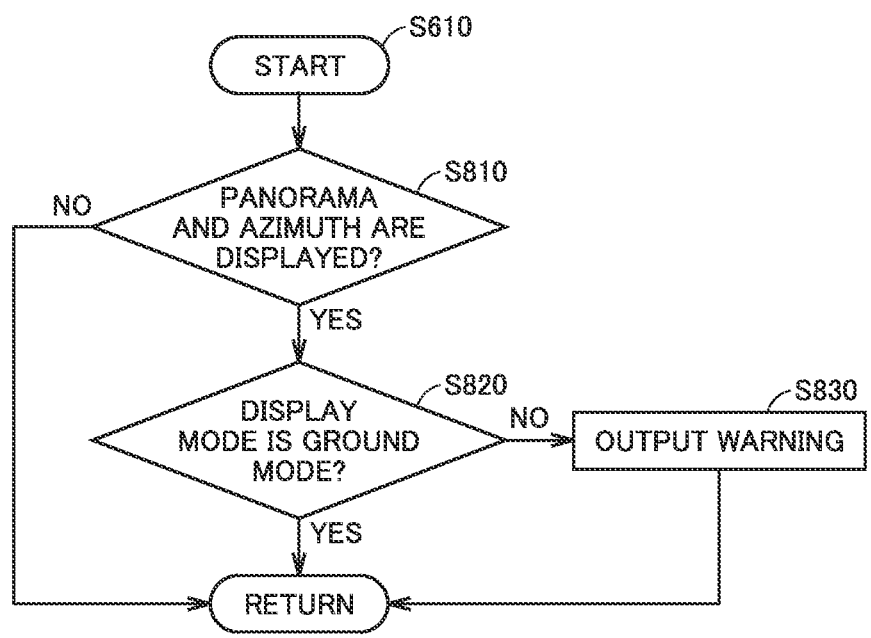
FIG. 8 is a view illustrating an example of a second procedure for detecting whether the unexecutable processing procedure is included in the instructions.

In step S610, CPU 501 detects whether an unexecutable processing procedure is included in the instructions. With reference to FIGS. 7 and 8, details of step S610 will be described. CPU 501 sequentially executes the processing in FIG. 7 and the processing in FIG. 8 as the processing of step S610.

Figure 9:
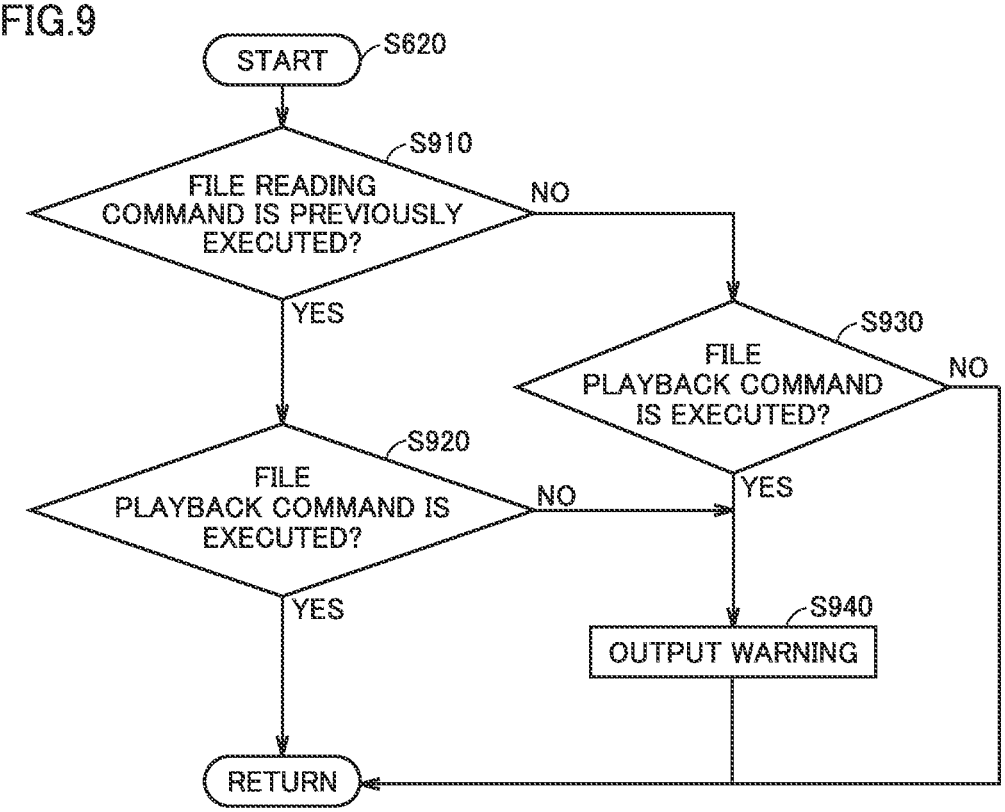
FIG. 9 is a view illustrating an example of a first procedure for detecting whether an unrecommended processing procedure is included in the instructions.
Figure 10:
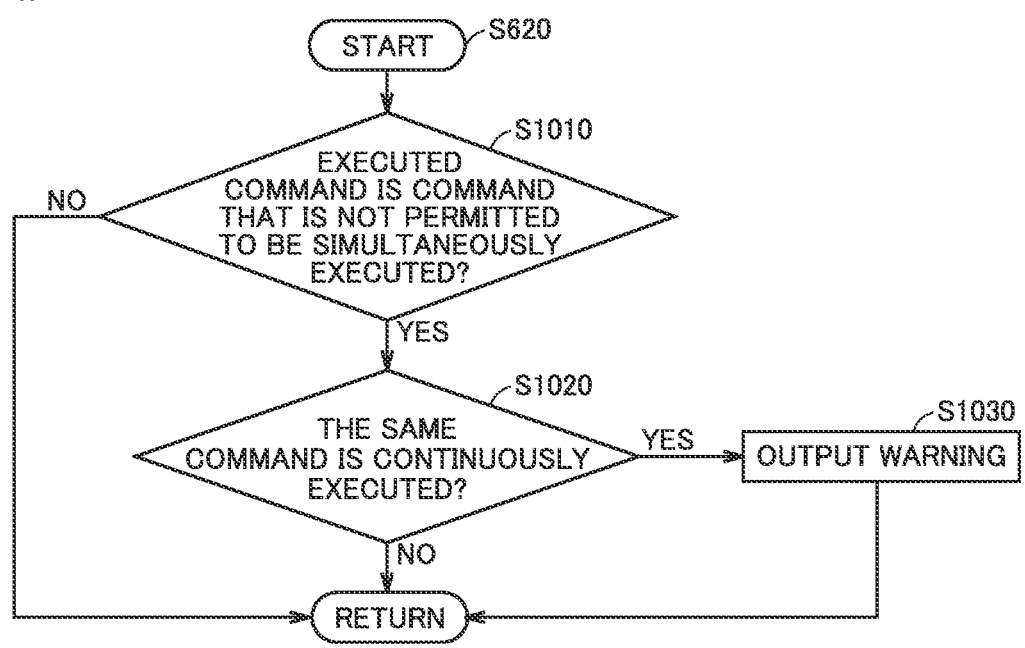
FIG. 10 is a view illustrating an example of a second procedure for detecting whether the unrecommended processing procedure is included in the instructions.
Figure 11:
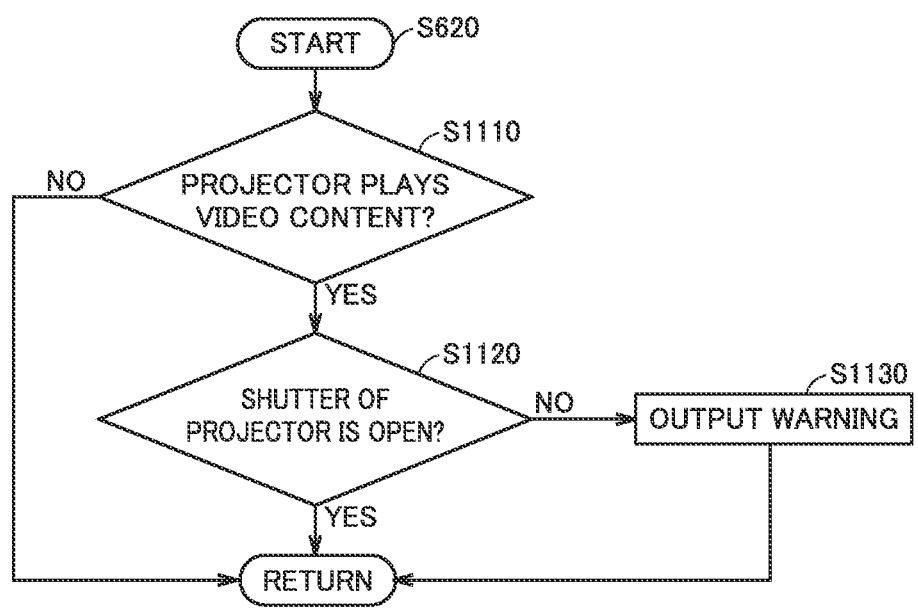
FIG. 11 is a view illustrating an example of a third procedure for detecting whether the unrecommended processing procedure is included in the instructions.

In step S620, CPU 501 detects whether an unrecommended processing procedure is included in the instructions. With reference to FIGS. 9 to 11, details of step S620 will be described. CPU 501 sequentially executes the processing in FIG. 9, the processing in FIG. 10, and the processing in FIG. 11 as the processing of step S620.

Figure 12:
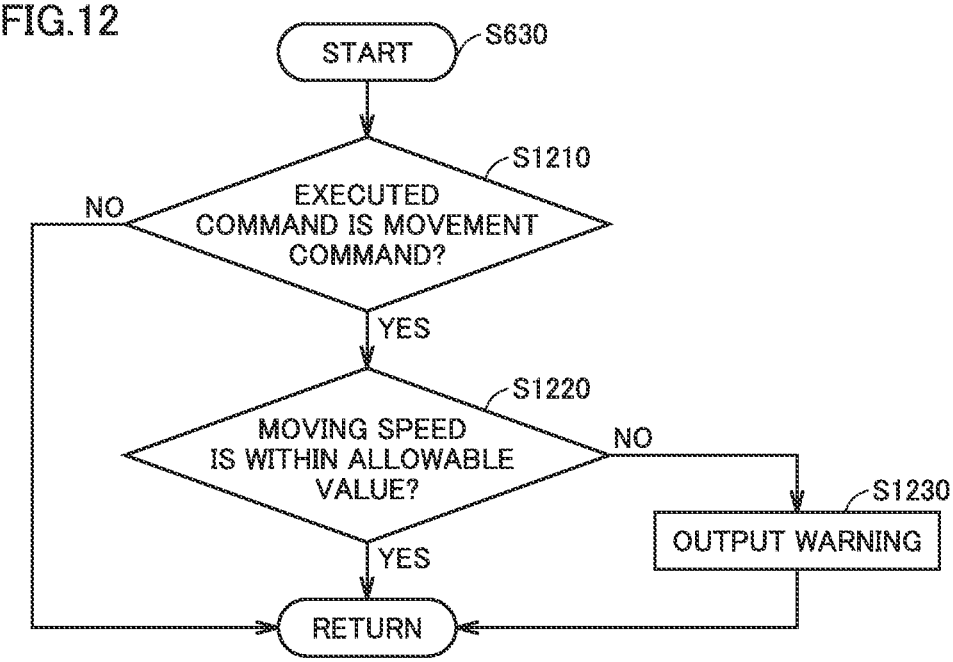
FIG. 12 is a view illustrating an example of a first procedure for detecting whether the processing procedure exceeding the performance limit of an instrument is included in the instructions.
Figure 13:
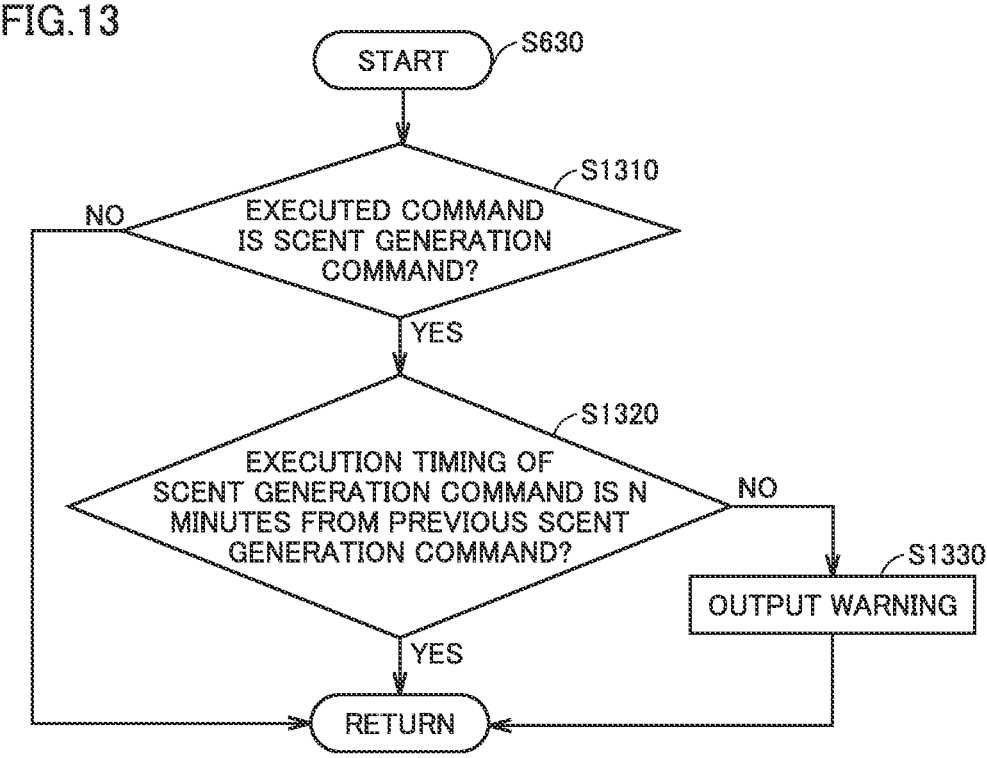
FIG. 13 is a view illustrating an example of a second procedure for detecting whether the processing procedure exceeding the performance limit of the instrument is included in the instructions.
Figure 14:
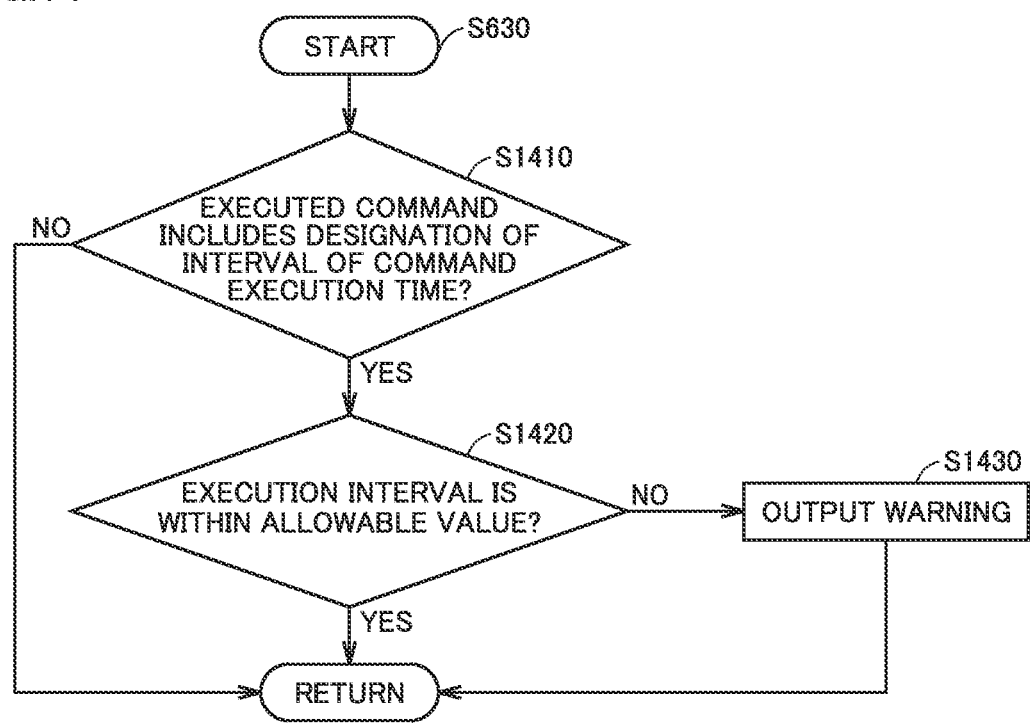
FIG. 14 is a view illustrating an example of a third procedure for detecting whether the processing procedure exceeding the performance limit of the instrument is included in the instructions.

In step S630, CPU 501 detects whether a processing procedure exceeding the performance limit of the instrument is included in the instructions. With reference to FIGS. 12 to 14, details of step S630 will be described. CPU 501 sequentially executes the processing in FIG. 12, the processing in FIG. 13, and the processing in FIG. 14 as the processing of step S630.

In step S640, CPU 501 outputs the simulation execution result. The execution result may include defect information and warning information detected in steps S610 to S630. When the defect is not included in the instructions, the execution result may include information indicating that the instructions are normal or information indicating that the defect is not included.

FIG. 7 is a view illustrating an example of a first procedure for detecting whether an unexecutable processing procedure is included in the instructions. In step S710, CPU 501 determines whether a picture, a line, or a name of the constellation is displayed. More specifically, CPU 501 determines whether the command displaying the picture, the line, and the name of the constellation on the projector is included in the instructions.

When CPU 501 determines that the picture, the line, or the name of the constellation is displayed (YES in step S710), the control proceeds to step S720. Otherwise (NO in step S710), CPU 501 ends the processing.

In step S720, CPU 501 determines whether the displayed constellation can be observed. More specifically, CPU 501 can determine whether the displayed constellation is observable based on information such as latitude, longitude, or date and time (season) of a sky currently displayed on the screen. For example, it is assumed that a command to display Orion is executed when the sky currently displayed on the screen is the summer sky. In the northern hemisphere, Orion is a winter constellation and cannot be observed in the summer sky. Accordingly, CPU 501 determines that the execution of the command is the defect.

When determining that the displayed constellation can be observed (YES in step S720), CPU 501 ends the processing. Otherwise (NO in step S720), CPU 501 shifts the control to step S730.

In one aspect, CPU 501 can acquire the information about astronomy used in step S720 (positions of constellations, information of seasons in which the constellation is observed, and the like) from control PC 112 of optical type planetarium projector 114. In another aspect, secondary storage device 503 may previously store the information regarding the astronomy used in step S720. In this case, CPU 501 reads the information about the astronomy from secondary storage device 503.

In step S730, CPU 501 outputs a warning. In one aspect, CPU 501 may output all the warnings after all the pieces of processing of steps S610, S620, and S630 are completed. In another aspect, CPU 501 may sequentially output the warning every time the defect is detected. In another aspect, CPU 501 may output the warning to the display of control device 100, or transmit the warning to another device.

FIG. 8 is a view illustrating an example of a second procedure for detecting whether the unexecutable processing procedure is included in the instructions. In step S810, CPU 501 determines whether panorama and azimuth are displayed. As an example, CPU 501 can determine whether a panoramic video or an azimuth video is displayed.

When determining that the panorama and azimuth is displayed (YES in step S810), CPU 501 shifts the control to step S820. Otherwise (NO in step S810), CPU 501 ends the processing.

In step S820, CPU 501 determines whether the display mode of the projector is a ground mode. When determining that the display mode of the projector is the ground mode (YES in step S820), CPU 501 ends the processing. Otherwise (NO in step S820), CPU 501 shifts the control to step S830. The ground mode is a mode in which scenery from the earth's surface, the moon, or the like, the heavenly body, or the like is displayed. The display mode includes a space mode in addition to the ground mode. The space mode is a mode in which outer space is projected from a perspective of looking down on the earth, the sun, or the like.

In step S830, CPU 501 outputs the warning. In one aspect, CPU 501 may output all the warnings after all the pieces of processing of steps S610, S620, and S630 are completed. In another aspect, CPU 501 may sequentially output the warning every time the defect is detected. In another aspect, CPU 501 may output the warning to the display of control device 100, or transmit the warning to another device.

FIG. 9 is a view illustrating an example of a first procedure for detecting whether an unrecommended processing procedure is included in the instructions. In step S910, CPU 501 determines whether a file reading command is previously executed. When CPU 501 determines that the file reading command is previously executed (YES in step S910), the control proceeds to step S920. Otherwise (NO in step S910), CPU 501 shifts the control to step S930.

In step S920, CPU 501 determines whether a file playback command (for example, a video file playback command) is executed. When determining that the file playback command is executed (YES in step S920), CPU 501 ends the processing. Otherwise (NO in step S920), CPU 501 shifts the control to step S940.

In step S930, CPU 501 determines whether the file playback command is executed. When determining that the file playback command is executed (YES in step S930), CPU 501 shifts the control to step S940. Otherwise (NO in step S930), CPU 501 ends the processing.

In step S940, CPU 501 outputs the warning. In one aspect, CPU 501 may output all the warnings after all the pieces of processing of steps S610, S620, and S630 are completed. In another aspect, CPU 501 may sequentially output the warning every time the defect is detected. In another aspect, CPU 501 may output the warning to the display of control device 100, or transmit the warning to another device.

FIG. 10 is a view illustrating an example of a second procedure for detecting whether the unrecommended processing procedure is included in the instructions. In step S1010, CPU 501 determines whether the executed command is a command that is not permitted to be simultaneously executed. For example, this determination is made based on a list of commands that are registered in rule storage 404 and prohibited from being executed at the same time. When CPU 501 determines that the executed command is a command that is not permitted to be simultaneously executed (YES in step S1010), the control proceeds to step S1020. Otherwise (NO in step S1010), CPU 501 ends the processing.

In step S1020, CPU 501 determines whether the same command is continuously executed. For example, CPU 501 can detect continuous execution of the commands that do not need to be executed a plurality of times, such as an initialization command. When CPU 501 determines that the same command is continuously executed (YES in step S1020), the control proceeds to step S1030. Otherwise (NO in step S1020), CPU 501 ends the processing.

In step S1030, CPU 501 outputs the warning. In one aspect, CPU 501 may output all the warnings after all the pieces of processing of steps S610, S620, and S630 are completed. In another aspect, CPU 501 may sequentially output the warning every time the defect is detected. In another aspect, CPU 501 may output the warning to the display of control device 100, or transmit the warning to another device.

FIG. 11 is a view illustrating an example of a third procedure for detecting whether the unrecommended processing procedure is included in the instructions. In step S1110, CPU 501 determines whether the projector plays the video content (or any file such as an audio file). For example, this determination is made based on whether the executed command is a playback command or whether the video content is referred to. When determining that the projector plays the video content (YES in step S1110), CPU 501 shifts the control to step S1120. Otherwise (NO in step S1110), CPU 501 ends the processing.

In step S1120, CPU 501 determines whether the shutter of the projector is open. For example, this determination is made based on whether a command to open the shutter of the projector is previously executed. When determining that the shutter of the projector is open (YES in step S1120), CPU 501 ends the processing. Otherwise (NO in step S1120), CPU 501 shifts the control to step S1130.

In step S1130, CPU 501 outputs the warning. In one aspect, CPU 501 may output all the warnings after all the pieces of processing of steps S610, S620, and S630 are completed. In another aspect, CPU 501 may sequentially output the warning every time the defect is detected. In another aspect, CPU 501 may output the warning to the display of control device 100, or transmit the warning to another device.

FIG. 12 is a view illustrating an example of a first procedure for detecting whether the processing procedure exceeding the performance limit of an instrument is included in the instructions. In step S1210, CPU 501 determines whether the executed command is a movement command. The movement command is a movement of the position of the constellation drawn on the screen. The execution of the movement command may involve driving of the motor of the projector or the like. When CPU 501 determines that the executed command is the movement command (YES in step S1210), the control proceeds to step S1220. Otherwise (NO in step S1210), CPU 501 ends the processing.

In step S1220, CPU 501 determines whether a moving speed of the instrument operated by the movement command is within an allowable value. When CPU 501 determines that the moving speed of the instrument operated by the movement command is the moving speed within the allowable value (YES in step S1220), the processing is ended. Otherwise (NO in step S1220), CPU 501 shifts the control to step S1230.

In step S1230, CPU 501 outputs the warning. In one aspect, CPU 501 may output all the warnings after all the pieces of processing of steps S610, S620, and S630 are completed. In another aspect, CPU 501 may sequentially output the warning every time the defect is detected. In another aspect, CPU 501 may output the warning to the display of control device 100, or transmit the warning to another device.

FIG. 13 is a view illustrating an example of a second procedure for detecting whether the processing procedure exceeding the performance limit of the instrument is included in the instructions. In step S1310, CPU 501 determines whether the executed command is a scent generation command. For example, the scent generation command is a command operating an aroma generator that is one of external instruments 130. When determining that the executed command is the scent generation command (YES in step S1310), CPU 501 shifts the control to step S1320. Otherwise (NO in step S1310), CPU 501 ends the processing.

In step S1320, CPU 501 determines whether the execution timing of the scent generation command is after N minutes (N may be any predetermined time) from the previous execution of the scent generation command. When CPU 501 determines that the execution timing of the scent generation command is after N minutes from the previous execution of the scent generation command (YES in step S1320), the processing is ended. Otherwise (NO in step S1320), CPU 501 shifts the control to step S1330.

In step S1330, CPU 501 outputs the warning. In one aspect, CPU 501 may output all the warnings after all the pieces of processing of steps S610, S620, and S630 are completed. In another aspect, CPU 501 may sequentially output the warning every time the defect is detected. In another aspect, CPU 501 may output the warning to the display of control device 100, or transmit the warning to another device.

FIG. 14 is a view illustrating an example of a third procedure for detecting whether the processing procedure exceeding the performance limit of the instrument is included in the instructions. In step S1410, CPU 501 determines whether the executed command includes designation of an interval of the execution time. For example, sometimes a constraint (interval designation) that an execution interval must be more than or equal to 100 milliseconds depending on the command. When CPU 501 determines that the executed command includes the designation of the interval of the execution time (YES in step S1410), the control proceeds to step S1420. Otherwise (NO in step S1410), CPU 501 ends the processing.

In one aspect, CPU 501 may further determine whether the content of the executed command includes processing exceeding the communication performance of each instrument, namely, a communication processing requiring communication performance greater than or equal to communication performance of the instrument. When the content of the executed command includes the processing exceeding the communication performance of each instrument, CPU 501 can determine that the instructions include the defect.

In step S1420, CPU 501 determines whether the execution interval between the executed command and the command executed last time is within the allowable value. When determining that the execution interval between the executed command and the command executed last time is within the allowable value (YES in step S1420), CPU 501 ends the processing. Otherwise (NO in step S1420), CPU 501 shifts the control to step S1430.

In step S1430, CPU 501 outputs the warning. In one aspect, CPU 501 may output all the warnings after all the pieces of processing of steps S610, S620, and S630 are completed. In another aspect, CPU 501 may sequentially output the warning every time the defect is detected. In another aspect, CPU 501 may output the warning to the display of control device 100, or transmit the warning to another device.

As described above, control device 100 of one or more embodiments can detect the defect of the instructions only by executing the simulation without actually operating the instrument included in the system of the theater or attraction. As a result, for example, the check period (loading period) of the instructions for the next performance of the planetarium can be greatly shortened.

In one aspect, control device 100 does not need to be actually incorporated in the system of the theater or attraction, and may be implemented as a single device for simulation. Thus, for example, while the theater or attraction performs the current performance, control device 100 can perform the simulation of the instructions of the next performance.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing device comprising:
   a communication interface that receives instructions including a command to control a planetarium that projects a constellation;
   a storage that stores a rule of an execution procedure of the command;
   a CPU that verifies the instructions; and
   an output interface that outputs a verification result of the instructions, wherein the CPU:
   acquires the instructions through the communication interface, reads the rule from the storage,
   executes a simulation of projection of the constellation based on the command included in the instructions, and
   during the simulation, detects a defect of the instructions by comparing an execution procedure of the command with the rule, and
   the output interface outputs a detection result of the defect.

2. The information processing device according to claim 1, wherein
   the CPU determines whether the constellation is projectable based on information regarding latitude, longitude, or time of the constellation projected by the planetarium.

3. The information processing device according to claim 1, wherein
   the CPU determines whether the constellation is projectable based on a projection mode of the planetarium.

4. The information processing device according to claim 1, wherein
   when detecting the defect, the CPU determines whether the execution procedure of the command is an unrecommended procedure.

5. The information processing device according to claim 4, wherein
   when determining whether the execution procedure is the unrecommended procedure, the CPU determines whether a file is read before being played.

6. The information processing device according to claim 4, wherein
   when determining whether the execution procedure is the unrecommended procedure, the CPU determines whether a file is played after being read.

7. The information processing device according to claim 4, wherein
   when determining whether the execution procedure is the unrecommended procedure, the CPU determines whether the instructions include a procedure for simultaneously executing a first command and a second command that are not permitted to be simultaneously executed.

8. The information processing device according to claim 4, wherein
   when determining whether the execution procedure is the unrecommended procedure, the CPU determines whether a shutter of the planetarium playing a file is open.

9. The information processing device according to claim 1, wherein
   when detecting the defect, the CPU determines whether the execution procedure of the command includes a predetermined processing that the planetarium cannot execute within a predetermined time.

10. The information processing device according to claim 9, wherein
when determining whether the execution procedure includes the predetermined processing, the CPU determines whether the instructions include an operation exceeding performance of the planetarium.

11. The information processing device according to claim 9, wherein
when determining whether the execution procedure includes the predetermined processing, the CPU determines whether the planetarium is repeatedly used within a predetermined interval.

12. The information processing device according to claim 9, wherein
when determining whether the execution procedure includes the predetermined processing, the CPU determines whether an execution interval of a plurality of commands including the command is greater than or equal to a time interval at which the planetarium can execute the predetermined processing.

13. The information processing device according to claim 9, wherein
when determining whether the execution procedure includes the predetermined processing, the CPU determines whether to execute a communication processing requiring communication performance greater than or equal to communication performance of the planetarium.

14. A method for controlling in an information processing device, the method comprising:
acquiring instructions including a command to control a planetarium that projects a constellation;
acquiring a rule of an execution procedure of the command;
executing a simulation of projection of the constellation based on the command included in the instructions;
during the simulation, detecting a defect of the instructions by comparing the execution procedure of the command with the rule; and
outputting a detection result of the defect.

15. The method according to claim 14, wherein
the determining whether the constellation is projectable is based on information regarding latitude, longitude, or time of the constellation projected by the planetarium.

16. The method according to claim 14, wherein
the determining whether the constellation is projectable is based on a projection mode of the planetarium.

17. The method according to claim 14, wherein
the detecting of the defect includes determining whether the execution procedure of the command is an unrecommended procedure.

18. A non-transitory computer-readable storage medium that stores instructions causing one or a plurality of processors to execute the method according to claim 14.

* * * * *